T. FARMER, Jr.
GOVERNOR MAGNET.
APPLICATION FILED SEPT. 5, 1913.

1,217,928.

Patented Mar. 6, 1917.

Witnesses:

Thomas Farmer Jr
Inventor

Attorney

UNITED STATES PATENT OFFICE.

THOMAS FARMER, JR., OF NEW YORK, N. Y., ASSIGNOR TO CONSOLIDATED CAR-HEATING COMPANY, OF ALBANY, NEW YORK, A CORPORATION OF WEST VIRGINIA.

GOVERNOR-MAGNET.

1,217,928.   Specification of Letters Patent.   Patented Mar. 6, 1917.

Application filed September 5, 1913. Serial No. 788,240.

*To all whom it may concern:*

Be it known that I, THOMAS FARMER, Jr., a citizen of the United States, residing at New York city, county and State of New York, have invented certain new and useful Improvements in Governor-Magnets, the following being a full, clear, and exact disclosure of the one form of my invention which I at present deem preferable.

For a detailed description of the present form of my invention, reference may be had to the following specification and to the accompanying drawing, which illustrate my invention, wherein—

Figure 1:
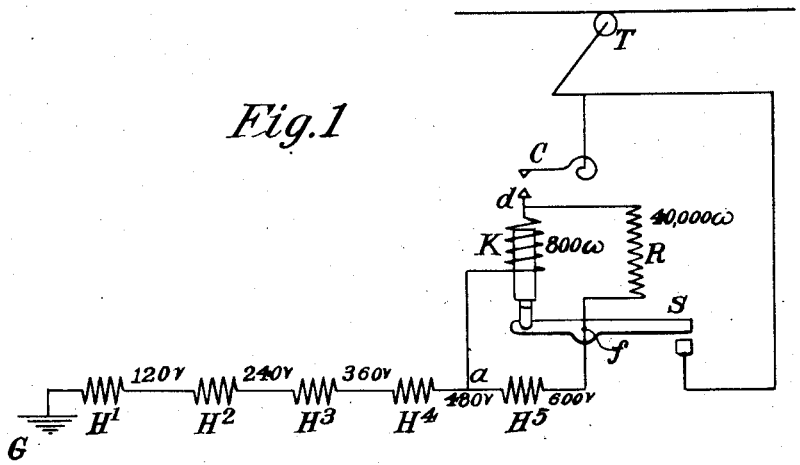
Figure 1 shows my invention diagrammatically.

My invention relates to a device for opening and closing an electric circuit containing a governor magnet for an electric switch. For example, the said circuit may be automatically closed by a thermostat when the temperature to which the thermostat is exposed reaches a specified value and, for illustration, I have shown it in connection with such a thermostatic arrangement wherein the magnet when energized closes the circuit of the electric heaters in a railway car or other apartment. I intend to use my device in any situations requiring the occasional and more or less frequent closure of the magnet circuit such as in air-brake systems, water-level control by a float and similar cases.

Referring to the drawing, S represents a switch that is to be automatically opened or closed at certain periods. In this case, it is to open and close the circuit of an electric heater comprising heater coils $H_1$ $H_2$ $H_3$ $H_4$ and $H_5$, which, when the circuit is closed, are operated by the current from the trolley T of an electric railway line having a voltage of—say 600—with respect to the ground. K is a switch-operating magnet and C is a thermostat which, at a given temperature, will cause a contact thereon to engage contact $d$ to apply the trolley voltage to magnet K which has one of its terminals connected to said contact $d$ and, of course, will break its engagement therewith at a higher temperature. The opposite terminals of magnet-coil K is connected to an intermediate point in the heater, in this case at the point $a$ between sections $H_4$ and $H_5$. The magnet will have a considerable resistance—say 800 ohms—and a very high resistance R—say 40,000 ohms will be connected between the contact point $d$ and the terminal point $f$ of the heater circuit, which point $f$ is also connected, of course, to the switch S. It may be assumed that each heater section has a resistance of 20 ohms, so that, when switch S is closed, a current of six amperes will flow through the heater, each section thereof consuming 120 volts, so that, the point $f$ being at 600 volts, the point $a$ will be at 480 volts. When, on the other hand, the switch S is open and thermostat C closed, the point $a$ will be at only about 54 volts. Hence at the instant of closure of the thermostat C, the magnet K will be subject to a potential difference of about 546 volts, and will immediately act to close switch S, but when it has closed the said switch, the said magnet K receives a potential difference of only 120 volts. The resistance R is of such high amount that it does not have any practical effect in diverting current around the magnet K and has been neglected in the foregoing figures, but while it does not practically decrease either the initial power or the retaining power of the magnet K, yet it is of importance when the thermostat opens its contacts—as the 40,000 ohms resistance R is then in series with the 800 ohms magnet coil K across a potential of 120 volts and the current flow is so small through coil K that it cannot hold in its core any longer and the switch S opens.

The resistance R then absorbs the inductive effect caused by the opening of the magnet circuit and prevents an arc at the contact $d$, it being also observed that the thermostat breaks contact at $d$ while the switch S is still closed, the voltage that is thus broken being only 120.

By means of the device described above I am enabled to use but a single magnet for controlling the heaters automatically, in contrast to the ordinary practice of using two magnets, one to open and the other to close the switch S. That is due to the fact that the magnet K, although receiving a heavy current-impulse to cause its operation, will receive but a small current after it has closed switch S, which small current will be sufficient to retain the switch closed but not enough to heat the magnet coils, which can therefore be kept in circuit indefinitely. I am also able to have this single magnet actuate the switch S directly in contrast to the usual practice of using it merely as a relay to govern a more powerful switch-operating magnet or motor. The resistance R is also short-circuited while switch S and thermostat C are both closed and so does not need the costly construction required for a resistance generating heat which has to be radiated away.

Figure 2:
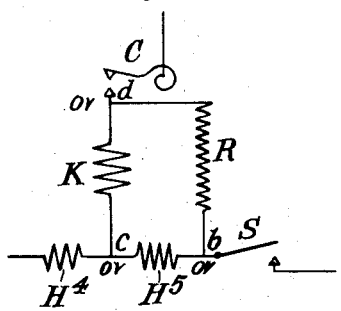
Figs. 2, 3, 4 and 5 show the different conditions of its operation.
Figure 3:
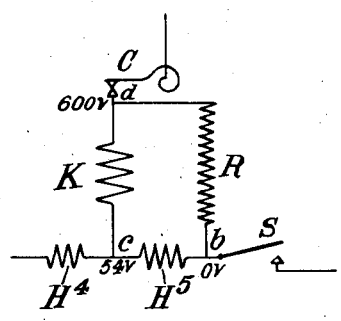
Figure 4:
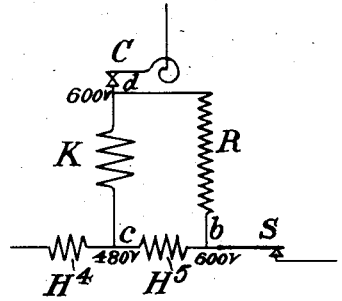
Figure 5:
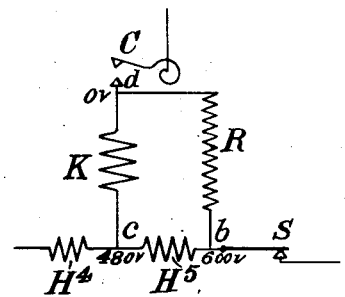

Fig. 2 represents the conditions when the thermostat contacts are fully open and the switch S is also open. Fig. 3 represents the conditions when the contact is closed at $d$ but before the magnet has closed the switch. Fig. 4 represents the conditions when the switch S is closed, and Fig. 5 represents the conditions when the contacts are open at $d$, but before the switch S has opened.

It will be understood that the figures I have given represent but those suitable for one situation wherein the voltage is at one given value. For other situations the figures will be altered according to the engineering requirements.

It will also be manifest that I operate the governor-magnet K by applying thereto a voltage that is determined by the resistance sections $H_1$, $H_2$, $H_3$ and $H_4$ which at that time reduce by only 54 volts the line voltage of 600 applied to the magnet so that the magnet receives the comparatively high voltage of 546. Subsequently I reduce this high voltage on the magnet by introducing additional current into the said resistance sections to raise the voltage-drop thereof. If this additional current is the current in the circuit controlled by switch S, as is the case in the embodiment of my invention exemplified herein, the voltage drop in said resistance-sections will be raised from 54 to 480, and that will reduce correspondingly the voltage applied to the magnet K. That is, it will now have but 120 volts applied to it instead of 546 volts. Finally I open the contacts $d$ at a time when magnet K is shunted by the resistance-section $H_5$ and the very high resistance R in series with $H_5$. The resistance-section $H_5$ is in the circuit through which the additional current aforesaid is introduced into sections $H_1$, $H_2$, $H_3$ and $H_4$ to raise the voltage-drop therein. Hence the section $H_5$ is subjected to that additional current and gives a voltage-drop dependent on the magnitude of that current. Resistance R is, on the other hand, in parallel with the said additional-current circuit and its voltage drop is independent of the said additional current.

What I claim as new and desire to secure by Letters Patent is:

1. The combination with a resistance and a source of current, of a switch interposed between the source of current and said resistance, a governor magnet for operating said switch, said magnet being interposed between the source of current and said resistance and grounded through the latter at an intermediate point, and contacts between said magnet and the source of current and operable to close the circuit directly to the magnet.

2. A governor-magnet and contacts therefor combined with a switch controlled by the magnet, a resistance controlled by the switch, a connection between the magnet coil and an intermediate point in said resistance, and a high resistance shunting said magnet.

3. A governor magnet and contacts therefor in combination with a resistance, a switch controlling the supply of current to said resistance, said switch being opened and closed by said magnet, and connections between one terminal of the magnet and one of said contacts, a portion of said resistance being interposed between the other terminal of said magnet and the ground.

4. A governor magnet and contacts therefor combined with a switch having a movable member controlled by said magnet, a connection between one terminal of the magnet and one of said contacts, a resistance between the other terminal of the magnet and the ground, and a resistance having one terminal connected with the movable member of said switch and the other terminal grounded through the first resistance at the point of connection of the magnet therewith.

5. A governor-magnet and contacts therefor, combined with a switch controlled by said magnet, a connection between one magnet terminal and one of said contacts, a resistance between the opposite magnet terminal and the switch, a high resistance shunting said magnet and said resistance, and a resistance between the last mentioned magnet terminal and the ground.

6. A governor-magnet circuit comprising two parallel branches, one branch containing a magnet coil and a resistance, the other branch containing a high resistance, a contact for the magnet connected to the said parallel branches on one side, and a switch controlled by said magnet and connected to the said parallel branches on the other side.

In witness whereof I have hereunto set my hand, before two subscribing witnesses, this 4th day of September, 1913.

THOMAS FARMER, Jr.

Witnesses:
FRANK DANNHAUSER,
L. T. S. ERISMAN.